United States Patent
Franciosi et al.

(10) Patent No.: US 10,540,112 B2
(45) Date of Patent: *Jan. 21, 2020

(54) SYSTEM AND METHOD FOR MIGRATING VIRTUAL MACHINES WITH STORAGE WHILE IN USE

(71) Applicant: Nutanix, Inc., San Jose, CA (US)

(72) Inventors: Felipe Franciosi, Cambridge (GB); Peter Turschmid, Seattle, WA (US); Malcolm Crossley, Cambridge (GB)

(73) Assignee: NUTANIX, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/889,693

(22) Filed: Feb. 6, 2018

(65) Prior Publication Data

US 2019/0243573 A1 Aug. 8, 2019

(51) Int. Cl.
*G06F 3/06* (2006.01)
*G06F 9/455* (2018.01)

(52) U.S. Cl.
CPC .......... *G06F 3/0647* (2013.01); *G06F 3/0604* (2013.01); *G06F 3/067* (2013.01); *G06F 3/0631* (2013.01); *G06F 3/0644* (2013.01); *G06F 3/0664* (2013.01); *G06F 9/45558* (2013.01); *G06F 2009/4557* (2013.01); *G06F 2009/45562* (2013.01)

(58) Field of Classification Search
CPC .... G06F 3/0647; G06F 3/0617; G06F 3/0683; G06F 11/1448; G06F 9/45558
See application file for complete search history.

(56) References Cited

U.S. PATENT DOCUMENTS

| | | | | |
|---|---|---|---|---|
| 5,835,954 A | * | 11/1998 | Duyanovich | G06F 3/0614 711/162 |
| 8,010,485 B1 | * | 8/2011 | Chatterjee | G06F 3/061 707/609 |
| 8,356,149 B2 | * | 1/2013 | Young | G06F 9/5016 711/162 |

(Continued)

OTHER PUBLICATIONS

"Bitmap Indices, Advantages and Disadvantages". Tutorial. <https://web.archive.org/web/20160113144603/https://www.tutorialcup.com/dbms/bitmap-indices.htm>. Published Jan. 13, 2016. (Year: 2016).*

(Continued)

*Primary Examiner* — Charles Rones
*Assistant Examiner* — Hewy H Li
(74) *Attorney, Agent, or Firm* — Foley & Lardner LLP

(57) ABSTRACT

A system and method for migrating a virtual machine and storage may include receiving a request to migrate a virtual machine from a host machine. The system and method include establishing a storage space on a shared storage space and creating an access table and a location table. The access table includes access values indicative of data being accessed. The location table includes location values indicative of a location of the data in the first storage space or a shared storage space. A transfer of data between the first storage space and the shared storage space is done using the access table and the location table. The data is accessible in both the first storage space the shared storage space based on the one or more location values of the location table and access to the data is based on the one or more access values of the access table.

33 Claims, 9 Drawing Sheets

(56) References Cited

U.S. PATENT DOCUMENTS

| | | | |
|---|---|---|---|
| 8,417,905 B2* | 4/2013 | Linde | G06F 11/1466 |
| | | | 707/649 |
| 8,549,518 B1 | 10/2013 | Aron et al. | |
| 8,601,473 B1 | 12/2013 | Aron et al. | |
| 8,850,130 B1 | 9/2014 | Aron et al. | |
| 9,354,906 B1 | 5/2016 | Uchronski et al. | |
| 9,552,233 B1 | 1/2017 | Tsirkin et al. | |
| 9,772,866 B1 | 9/2017 | Aron et al. | |
| 2006/0259728 A1* | 11/2006 | Chandrasekaran | G06F 3/0605 |
| | | | 711/170 |
| 2006/0277383 A1* | 12/2006 | Hayden | H04L 67/1097 |
| | | | 711/170 |
| 2009/0037680 A1* | 2/2009 | Colbert | G06F 3/0617 |
| | | | 711/162 |
| 2009/0144389 A1* | 6/2009 | Sakuta | G06F 9/455 |
| | | | 709/215 |
| 2012/0066677 A1 | 3/2012 | Tang | |
| 2012/0137098 A1* | 5/2012 | Wang | G06F 3/0617 |
| | | | 711/165 |
| 2015/0193250 A1* | 7/2015 | Ito | G06F 9/4856 |
| | | | 718/1 |
| 2016/0139962 A1* | 5/2016 | Tsirkin | G06F 9/5088 |
| | | | 718/1 |
| 2016/0253339 A1* | 9/2016 | Ambrose | G06F 3/0608 |
| | | | 707/693 |
| 2017/0364394 A1* | 12/2017 | Fujita | G06F 9/4856 |
| 2018/0121305 A1* | 5/2018 | Kameyama | G06F 3/0604 |
| 2018/0285202 A1 | 10/2018 | Bhagi et al. | |

OTHER PUBLICATIONS

"How Can a Virtual Machine be Moved or Migrated?". Oracle. <https://web.archive.org/web/20160508163204/https://docs.oracle.com/cd/E64076_01/E64081/html/vmcon-vm-move.html>. Published May 8, 2016. (Year: 2016).*

Khanna, Gunjan, et al. "Application performance management in virtualized server environments." Network Operations and Management Symposium, 2006. NOMS 2006. 10th IEEE/IFIP. IEEE, 2006. (Year: 2006).*

Hirofuchi, Takahiro, et al. "A live storage migration mechanism over wan for relocatable virtual machine services on clouds." Proceedings of the 2009 9th IEEE/ACM International Symposium on Cluster Computing and the Grid. IEEE Computer Society, 2009. pp. 67-74.

Xu, Qiumin, et al. "Performance analysis of NVMe SSDs and their implication on real world databases." Proceedings of the $8^{th}$ ACM International Systems and Storage Conference. ACM, 2015.

Poitras, Steven. "The Nutanix Bible" (Jan. 11, 2014), from http://stevenpoitras.com/the-nutanix-bible/ (Publication date based on indicated capture date by Archive.org; first publication date unknown).

Poitras, Steven. "The Nutanix Bible" (Jan. 12, 2016), from https://nutanixbible.com/.

Poitras, Steven. "The Nutanix Bible" (Oct. 15, 2013), from http://stevenpoitras.com/the-nutanix-bible/ (Publication date based on indicated capture date by Archive.org; first publication date unknown).

Poitras, Steven. "The Nutanix Bible" (Jun. 20, 2014), from http://stevenpoitras.com/the-nutanix-bible/ (Publication date based on indicated capture date by Archive.org; first publication date unknown).

Poitras, Steven. "The Nutanix Bible" (Jan. 3, 2017), from https://nutanixbible.com/.

Poitras, Steven. "The Nutanix Bible" (Jan. 3, 2018), from https://nutanixbible.com/.

Poitras, Steven. "The Nutanix Bible" (Sep. 4, 2015), from https://nutanixbible.com/.

Poitras, Steven. "The Nutanix Bible" (Jan. 7, 2015), from http://stevenpoitras.com/the-nutanix-bible/ (Publication date based on indicated capture date by Archive.org; first publication date unknown).

Poitras, Steven. "The Nutanix Bible" (Jun. 8, 2017), from https://nutanixbible.com/.

Poitras, Steven. "The Nutanix Bible" (Jun. 9, 2015), from http://stevenpoitras.com/the-nutanix-bible/ (Publication date based on indicated capture date by Archive.org; first publication date unknown).

Poitras, Steven. "The Nutanix Bible" (Jun. 9, 2016), from https://nutanixbible.com/.

* cited by examiner

SYSTEM AND METHOD FOR MIGRATING VIRTUAL MACHINES WITH STORAGE WHILE IN USE

BACKGROUND

The following description is provided to assist the understanding of the reader. None of the information provided or references cited is admitted to be prior art.

Virtual computing systems are widely used in a variety of applications. Virtual computing systems include one or more host machines running one or more virtual machines concurrently. The one or more virtual machines utilize the hardware resources of the underlying one or more host machines. Each virtual machine may be configured to run an instance of an operating system. Modern virtual computing systems allow several operating systems and several software applications to be safely run at the same time on the virtual machines of a single host machine, thereby increasing resource utilization and performance efficiency. Each virtual machine is managed by a hypervisor or virtual machine monitor. Occasionally, data for a virtual machine may be migrated from a first storage space to a second storage space, such as for maintenance of the first machine, utilization of particular resources of a second host machine, migration of a virtual machine, etc. Typically, a copy of the data in the first storage space is made, either directly to the destination storage space or to an interim storage space. However, in each of these instances, a full copy of the storage space is made and/or use of the original storage space must be ceased otherwise the resulting copy of the data will differ from the in-use data. Presented herein is a method for migrating virtual machines and respective data of a storage space while permitting use of the data by the virtual machine.

SUMMARY

In accordance with at least some aspects of the present disclosure, a method is disclosed. The method includes receiving a request to migrate a virtual machine from a first host machine. The method includes establishing a storage space on a shared storage space and creating, by a storage space transfer system, an access table and a location table, the access table comprising one or more access values indicative of data being accessed, the location table comprising one or more location values indicative of a location of the data in a first storage space of the first host machine or the storage space in the shared storage space. The method also includes transferring data between the first storage space and the storage space in the shared storage space using the access table and the location table. A first portion of data is accessible in the first storage space and a second portion of data is accessible in the storage space of the shared storage space based on the one or more location values of the location table. Access to the data is based on the one or more access values of the access table.

In accordance with another aspect of the present disclosure, another method is disclosed. The method includes receiving a request to migrate a virtual machine from a first host machine. The method includes establishing a storage space on a shared storage space and creating, by a storage space transfer system, an access table and a location table, the access table comprising one or more access values indicative of data being accessed, the location table comprising one or more location values indicative of a location of the data in a first storage space of the first host machine or storage space in the shared storage space. The method also includes accessing an access range of the access table and determining the access range is not in use based on one or more access values in the access range. The method further includes determining a location range corresponding to the access range is not in the storage space of the shared storage space based on one or more location values in the location range and setting the one or more access values in the access range to an access value indicative of the underlying data being in use. The method includes transferring data for the access range between the first storage space and the storage space of the shared storage space and updating the one or more location values in the location range to be indicative of the data stored in the storage space of the shared storage space. The method still further includes resetting the one or more access values in the access range to an access value indicative of the underlying data not being in use. A first portion of data is accessible in the first storage space and a second portion of data is accessible in the storage space of the shared storage space based on the one or more location values of the location table.

In accordance with some other aspects of the present disclosure, a system is disclosed. The system includes a storage space transfer system in a virtual computing system. The storage space transfer system is configured to receive an indication of a virtual machine migration; create an access table and a location table, the access table comprising one or more access values indicative of data being accessed, the location table comprising one or more location values indicative of a location of the data in a first storage space of a first host machine or a storage space of a shared storage space; and transfer data between the first storage space and the storage space of a shared storage space using the access table and the location table. A first portion of data is accessible in the first storage space and a second portion of data is accessible in the storage space of a shared storage space based on the one or more location values of the location table. Access to the data is based on the one or more access values of the access table.

The foregoing summary is illustrative only and is not intended to be in any way limiting. In addition to the illustrative aspects, embodiments, and features described above, further aspects, embodiments, and features will become apparent by reference to the following drawings and the detailed description.

Figure 1:
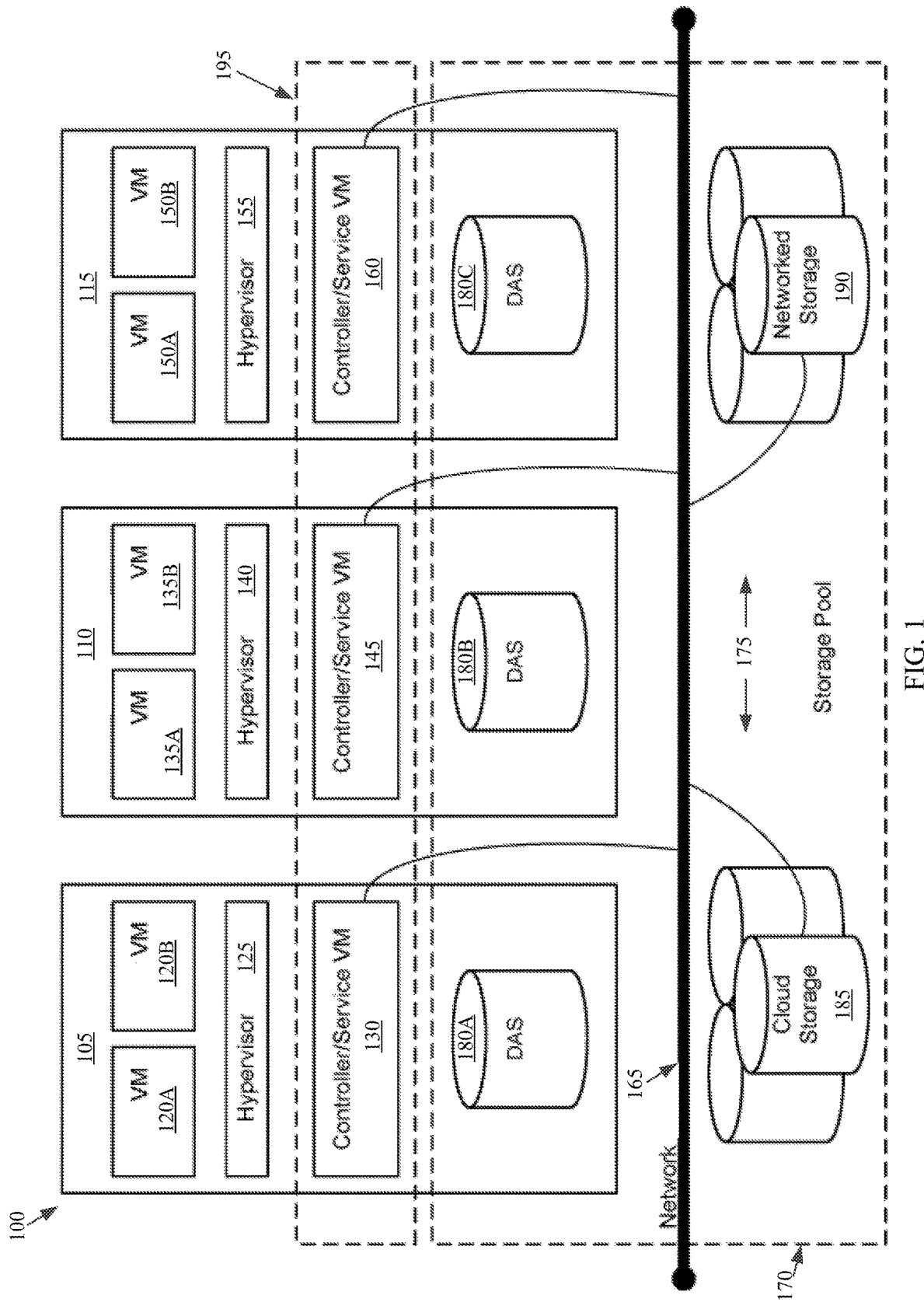
FIG. 1 is a block diagram of a virtual computing system, in accordance with some embodiments of the present disclosure.

The foregoing and other features of the present disclosure will become apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

The present disclosure is generally directed to a virtual computing system having a plurality of clusters, with each cluster having a plurality of nodes. Each of the plurality of nodes includes one or more virtual machines managed by an instance of a hypervisor. Each virtual machine uses a storage space to store and operate on data. The storage space may be a virtual disk that is visible only to the host machine on which the virtual machine is operating. Occasionally, data stored in a first storage space may be moved to a second storage space. For instance, a first storage space may be used for normal usage while a second storage space may be optimized for high performance, such as modern low-latency technologies such as NVMe or PMEM. In other instances, maintenance may be performed on the first storage space, such as replacement of a physical disk drive, etc. In still other instances, moving data from the first storage space to the second storage space may be done when migrating a virtual machine from a first host machine to a second host machine. The virtual machine may be managed by a hypervisor, such as an AHV type of hypervisor provided by Nutanix, Inc.

Conventionally, data stored in a storage space for the virtual machine is copied directly to a destination storage space. In such a situation, use and/or modification of the data is ceased while the copy occurs. Such a disruption reduces can affect users of virtual machines when the data to be transferred is large and/or network conditions result in a slow data transfer rate. This downtime of virtual machines requires scheduling data storage transfers at specific "maintenance" times, which may not particularly be convenient. Regardless of the inconvenience of scheduling the data storage transfer, the operation of a virtual machine can also suffer as the virtual machine may be inoperable during the data storage transfer. The performance of the virtual machine can suffer and prevent the virtual machine from performing certain tasks during the data storage transfer. Thus, a technical problem currently exists in which users, such as virtual machine users, are prevented from operating efficiently during data storage transfers. Such data storage transfers may be needed when migrating virtual machines from one host machine to another host machine. Thus, during migrations, the delay in transferring data for the data storage may be in addition to the migration of the virtual machine itself, thereby increasing the delay experienced by the user.

As a result, some systems have implemented alternative data transfer algorithms to permit usage of data while the data is being used or modified. Such data transfer algorithms include snapshotting data, dirty data tracking, and/or convergence algorithms to track what data is being modified and then iteratively transferring successive modified data. That is, a common method involves copying the data from first storage space to a destination or second storage space while keeping track of any modifications made to the source data as a result of the data being in use (i.e., dirty tracking). Once the initial copy completes, another iteration starts and copies only the data that has since been modified. Such methods rely on either the copying of the data to be fast enough to approach a converged state or require throttling on the virtual machine accessing the data to achieve a similar effect. When such a converged state is reached, access to the data is suspended for a final copy from the first storage space to the second, destination storage space. Such a data transfer algorithm may be difficult to implement if a large amount of data is modified during each iteration, thereby resulting in slow or no convergence. When a slow or no convergence situation occurs, the underlying performance is stunted to allow the data transfer to eventually converge. However, such stunting of performance can result in unacceptably slow system performance.

Another method involves making the source data "copy-on-write" to achieve a snapshot effect. That is, modifications made to the source data are synchronously replicated to the destination data. In the background, an entire snapshot of the original source data is copied to the destination. Upon completion, the source data and the snapshot of the original source data on the destination are commonly coalesced via the synchronous replication in order to produce a flat view of the data. Variations of this method exist which also require convergence. This alternative data transfer algorithm may also be difficult to implement if a large amount of data is modified during each iteration, thereby resulting in continual synchronous replication of the data, thereby delaying the transfer for potentially unacceptably long periods of time.

The present disclosure provides an improved solution, particularly for migrating virtual machine virtual disks. For example, the present disclosure provides a migration tool that facilitates transferring data from a first storage space to a second storage space while significantly reducing the downtime to the user, such as a user of a virtual machine. Specifically, the data transfer tool facilitates data storage transfer such that only the data currently in use or currently being copied is impacted and only for a short period of time. Data that is not currently being copied or has already been transferred can be used and/or modified via normal operations.

Described herein is a method for transferring data from a first storage space to a second, destination storage space without dirty tracking, convergence, or snapshots. In the proposed method herein, two tables, such as bitmaps or other tabular representations, are utilized. A first table, called a location table, indicates whether the latest version of the data is at the first storage space or at the second, destination storage space. A second table, called an access table, indicates whether a particular range of the dataset (e.g., a block device sector) is currently in use or being copied. The access table guards access to the data and the corresponding regions of the location table when in use or being copied.

When data is being accessed, the corresponding range is automatically annotated on the access table. If any part of the range is already annotated, then the data range is being copied by a copier. The method allows the user, such as a virtual machine, to join a waiting list and sleep until further notice. If the full range is successfully annotated, the access can continue. For reads, the location table must be consulted to determine where the data must be read from. For writes, all data is sent to the destination and the location table must be updated accordingly. Once the access completes, the range is cleared from the access table.

When data is being copied by the copier, the corresponding range is automatically annotated on the access table. If any part of the range is already annotated, then the data range is being accessed. The copier will skip that range and attempt the next. If the full range is successfully annotated, then the copier checks the location table and copies any data that is still present at the source. When the copy completes, the location table is updated accordingly and the range cleared from the access table. At this point, if a user process is present on a waiting list, a notification is sent to the user to be woken up. The procedure continues until the entire location table indicates that all data is present at the destination storage space.

The present disclosure provides an easy, time saving, and automatic process for transferring data from a first storage space to a second storage space while permitting a user to access and modify the data without substantial disruptions.

Referring now to FIG. 1, a virtual computing system 100 is shown, in accordance with some embodiments of the present disclosure, though it should be understood that the present disclosure is not limited to a virtual computing system 100 environment. The virtual computing system 100 includes a plurality of nodes, such as a first node 105, a second node 110, and a third node 115. The first node 105 includes user virtual machines ("user VMs") 120A and 120B (collectively referred to herein as "user VMs 120"), a hypervisor 125 configured to create and run the user VMs, and a controller/service VM 130 configured to manage, route, and otherwise handle workflow requests between the various nodes of the virtual computing system 100. Similarly, the second node 110 includes user VMs 135A and 135B (collectively referred to herein as "user VMs 135"), a hypervisor 140, and a controller/service VM 145, and the third node 115 includes user VMs 150A and 150B (collectively referred to herein as "user VMs 150"), a hypervisor 155, and a controller/service VM 160. The controller/service VM 130, the controller/service VM 145, and the controller/service VM 160 are all connected to a network 165 to facilitate communication between the first node 105, the second node 110, and the third node 115. Although not shown, in some embodiments, the hypervisor 125, the hypervisor 140, and the hypervisor 155 may also be connected to the network 165.

The virtual computing system 100 also includes a storage pool 170. The storage pool 170 may include network-attached storage 175 and direct-attached storage 180A, 180B, and 180C. The network-attached storage 175 may be accessible via the network 165 and, in some embodiments, may include cloud storage 185, as well as local storage area network 190. In contrast to the network-attached storage 175, which is accessible via the network 165, the direct-attached storage 180A, 180B, and 180C may include storage components that are provided within each of the first node 105, the second node 110, and the third node 115, respectively, such that each of the first, second, and third nodes may access its respective direct-attached storage without having to access the network 165.

It is to be understood that only certain components of the virtual computing system 100 are shown in FIG. 1. Nevertheless, several other components that are needed or desired in the virtual computing system to perform the functions described herein are contemplated and considered within the scope of the present disclosure. Additional features of the virtual computing system 100 are described in U.S. Pat. No. 8,601,473, the entirety of which is incorporated by reference herein.

Although three of the plurality of nodes (e.g., the first node 105, the second node 110, and the third node 115) are shown in the virtual computing system 100, in other embodiments, greater than or fewer than three nodes may be used. Likewise, although only two of the user VMs (e.g., the user VMs 120, the user VMs 135, and the user VMs 150) are shown on each of the respective first node 105, the second node 110, and the third node 115, in other embodiments, the number of the user VMs on each of the first, second, and third nodes may vary to include either a single user VM or more than two user VMs. Further, the first node 105, the second node 110, and the third node 115 need not always have the same number of the user VMs (e.g., the user VMs 120, the user VMs 135, and the user VMs 150). Additionally, more than a single instance of the hypervisor (e.g., the hypervisor 125, the hypervisor 140, and the hypervisor 155) and/or the controller/service VM (e.g., the controller/service VM 130, the controller/service VM 145, and the controller/service VM 160) may be provided on the first node 105, the second node 110, and/or the third node 115.

In some embodiments, each of the first node 105, the second node 110, and the third node 115 may be a hardware device, such as a server. For example, in some embodiments, one or more of the first node 105, the second node 110, and the third node 115 may be an NX-1000 server, NX-3000 server, NX-6000 server, NX-8000 server, etc. provided by Nutanix, Inc. or server computers from Dell, Inc., Lenovo Group Ltd. or Lenovo PC International, Cisco Systems, Inc., etc. In other embodiments, one or more of the first node 105, the second node 110, or the third node 115 may be another type of hardware device, such as a personal computer, an input/output or peripheral unit such as a printer, or any type of device that is suitable for use as a node within the virtual computing system 100. In some embodiments, the virtual computing system 100 may be part of a data center.

Each of the first node 105, the second node 110, and the third node 115 may also be configured to communicate and share resources with each other via the network 165. For example, in some embodiments, the first node 105, the second node 110, and the third node 115 may communicate and share resources with each other via the controller/service VM 130, the controller/service VM 145, and the controller/service VM 160, and/or the hypervisor 125, the hypervisor 140, and the hypervisor 155. One or more of the first node 105, the second node 110, and the third node 115 may also be organized in a variety of network topologies, and may be termed as a "host" or "host machine."

Also, although not shown, one or more of the first node 105, the second node 110, and the third node 115 may include one or more processing units configured to execute instructions. The instructions may be carried out by a special purpose computer, logic circuits, or hardware circuits of the first node 105, the second node 110, and the third node 115. The processing units may be implemented in hardware, firmware, software, or any combination thereof. The term "execution" is, for example, the process of running an application or the carrying out of the operation called for by an instruction. The instructions may be written using one or more programming language, scripting language, assembly language, etc. The processing units, thus, execute an instruction, meaning that they perform the operations called for by that instruction.

The processing units may be operably coupled to the storage pool 170, as well as with other elements of the first node 105, the second node 110, and the third node 115 to receive, send, and process information, and to control the operations of the underlying first, second, or third node. The processing units may retrieve a set of instructions from the storage pool 170, such as, from a permanent memory device like a read only memory (ROM) device and copy the instructions in an executable form to a temporary memory device that is generally some form of random access memory (RAM). The ROM and RAM may both be part of the storage pool 170, or in some embodiments, may be separately provisioned from the storage pool. Further, the processing units may include a single stand-alone processing unit, or a plurality of processing units that use the same or different processing technology.

With respect to the storage pool 170 and particularly with respect to the direct-attached storage 180A, 180B, and 180C, each of the direct-attached storage may include a variety of types of storage devices. For example, in some embodiments, one or more of the direct-attached storage 180A, 180B, and 180C may include, but is not limited to, any type of RAM, ROM, flash memory, magnetic storage devices (e.g., hard disk, floppy disk, magnetic strips, etc.), optical disks (e.g., compact disk (CD), digital versatile disk (DVD), etc.), smart cards, solid state devices, etc. Likewise, the network-attached storage 175 may include any of a variety of network accessible storage (e.g., the cloud storage 185, the local storage area network 190, etc.) that is suitable for use within the virtual computing system 100 and accessible via the network 165. The storage pool 170 including the network-attached storage 175 and the direct-attached storage 180A, 180B, and 180C may together form a distributed storage system configured to be accessed by each of the first node 105, the second node 110, and the third node 115 via the network 165, the controller/service VM 130, the controller/service VM 145, and the controller/service VM 160, and/or the hypervisor 125, the hypervisor 140, and the hypervisor 155. In some embodiments, the various storage components in the storage pool 170 may be configured as virtual disks for access by the user VMs 120, the user VMs 135, and the user VMs 150.

Each of the user VMs 120, the user VMs 135, and the user VMs 150 is a software-based implementation of a computing machine in the virtual computing system 100. The user VMs 120, the user VMs 135, and the user VMs 150 emulate the functionality of a physical computer. Specifically, the hardware resources, such as processing unit, memory, storage, etc., of the underlying computer (e.g., the first node 105, the second node 110, and the third node 115) are virtualized or transformed by the respective hypervisor 125, the hypervisor 140, and the hypervisor 155, respectively, into the underlying support for each of the user VMs 120, the user VMs 135, and the user VMs 150 that may run its own operating system and applications on the underlying physical resources just like a real computer. By encapsulating an entire machine, including CPU, memory, operating system, storage devices, and network devices, the user VMs 120, the user VMs 135, and the user VMs 150 are compatible with most standard operating systems (e.g. Windows, Linux, etc.), applications, and device drivers. Thus, each of the hypervisor 125, the hypervisor 140, and the hypervisor 155 is a virtual machine monitor that allows a single physical server computer (e.g., the first node 105, the second node 110, third node 115) to run multiple instances of the user VMs 120, the user VMs 135, and the user VMs 150, with each user VM sharing the resources of that one physical server computer, potentially across multiple environments. By running the user VMs 120, the user VMs 135, and the user VMs 150 on each of the first node 105, the second node 110, and the third node 115, respectively, multiple workloads and multiple operating systems may be run on a single piece of underlying hardware computer (e.g., the first node, the second node, and the third node) to increase resource utilization and manage workflow.

The user VMs 120, the user VMs 135, and the user VMs 150 are controlled and managed by their respective instance of the controller/service VM 130, the controller/service VM 145, and the controller/service VM 160. The controller/service VM 130, the controller/service VM 145, and the controller/service VM 160 are configured to communicate with each other via the network 165 to form a distributed system 195. Each of the controller/service VM 130, the controller/service VM 145, and the controller/service VM 160 may also include a local management system (e.g., Prism Element from Nutanix, Inc.) configured to manage various tasks and operations within the virtual computing system 100. For example, as discussed below, in some embodiments, the local management system of the controller/service VM 130, the controller/service VM 145, and the controller/service VM 160 may facilitate transfer of data from a first storage space to a second storage space. In other implementations, each VM 120A, 120B, 135A, 135B, 150A, 150B may facilitate the transfer of data from a first storage space to a second storage space. In other implementations, each hypervisor 125, 140, 155 may facilitate the transfer of data from a first storage space to a second storage space. In still other implementations, an external system may facilitate the transfer of data from a first storage space to a second storage space.

The hypervisor 125, the hypervisor 140, and the hypervisor 155 of the first node 105, the second node 110, and the third node 115, respectively, may be configured to run virtualization software, such as, ESXi from VMWare, AHV from Nutanix, Inc., XenServer from Citrix Systems, Inc., etc., for running the user VMs 120, the user VMs 135, and the user VMs 150, respectively, and for managing the interactions between the user VMs and the underlying hardware of the first node 105, the second node 110, and the third node 115. Each of the controller/service VM 130, the controller/service VM 145, the controller/service VM 160, the hypervisor 125, the hypervisor 140, and the hypervisor 155 may be configured as suitable for use within the virtual computing system 100.

The network 165 may include any of a variety of wired or wireless network channels that may be suitable for use within the virtual computing system 100. For example, in some embodiments, the network 165 may include wired connections, such as an Ethernet connection, one or more twisted pair wires, coaxial cables, fiber optic cables, etc. In other embodiments, the network 165 may include wireless connections, such as microwaves, infrared waves, radio waves, spread spectrum technologies, satellites, etc. The network 165 may also be configured to communicate with another device using cellular networks, local area networks, wide area networks, the Internet, etc. In some embodiments, the network 165 may include a combination of wired and wireless communications.

Referring still to FIG. 1, in some embodiments, one of the first node 105, the second node 110, or the third node 115 may be configured as a leader node. The leader node may be configured to monitor and handle requests from other nodes in the virtual computing system 100. The leader node may also be configured to receive and handle requests (e.g., user requests) from outside of the virtual computing system 100. If the leader node fails, another leader node may be designated. Furthermore, one or more of the first node 105, the second node 110, and the third node 115 may be combined together to form a network cluster (also referred to herein as simply "cluster.") Generally speaking, all of the nodes (e.g., the first node 105, the second node 110, and the third node 115) in the virtual computing system 100 may be divided into one or more clusters. One or more components of the storage pool 170 may be part of the cluster as well. For example, the virtual computing system 100 as shown in FIG. 1 may form one cluster in some embodiments. Multiple clusters may exist within a given virtual computing system (e.g., the virtual computing system 100). The user VMs 120, the user VMs 135, and the user VMs 150 that are part of a cluster can be configured to share resources with each other. In some embodiments, multiple clusters may share resources with one another.

Further, in some embodiments, although not shown, the virtual computing system 100 includes a central management system (e.g., Prism Central from Nutanix, Inc.) that is configured to manage and control the operation of the various clusters in the virtual computing system. In some embodiments, the central management system may be configured to communicate with the local management systems on each of the controller/service VM 130, the controller/service VM 145, the controller/service VM 160 for controlling the various clusters.

Again, it is to be understood again that only certain components of the virtual computing system 100 are shown and described herein. Nevertheless, other components that may be needed or desired to perform the functions described herein are contemplated and considered within the scope of the present disclosure. It is also to be understood that the configuration of the various components of the virtual computing system 100 described above is only an example and is not intended to be limiting in any way. Rather, the configuration of those components may vary to perform the functions described herein.

Figure 2:
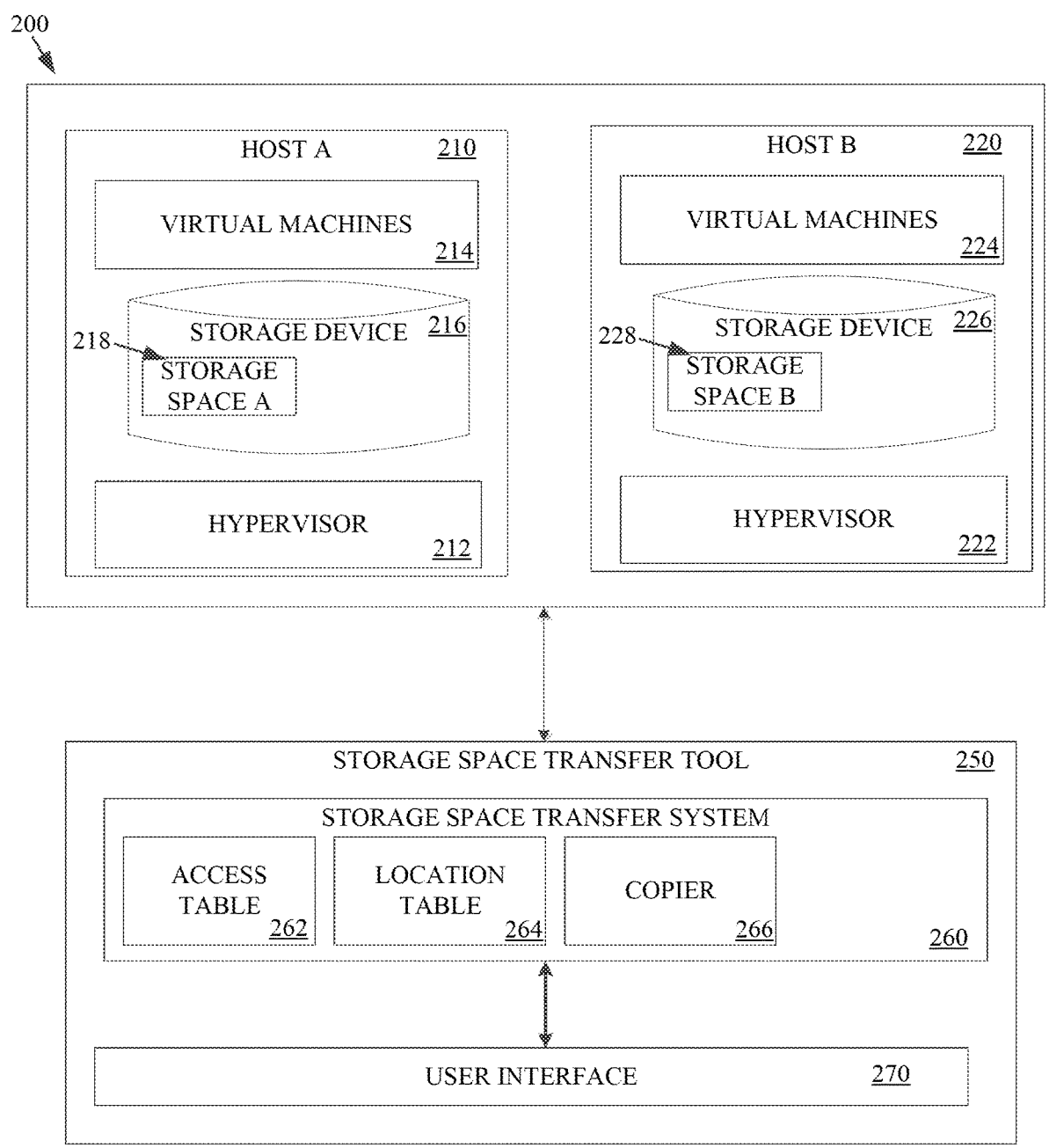
FIG. 2 is a block diagram of a storage space transfer system of the virtual computing system of FIG. 1, in accordance with some embodiments of the present disclosure.

Turning to FIG. 2, a block diagram of a data transfer system 200 is shown, in accordance with some embodiments of the present disclosure. The data transfer system 200 is used to transfer data stored in a first storage space, such as storage space A 218 to a second storage space, such as storage space B 228. While the implementation shown has storage space B 228 on a separate host machine B 220, it should be understood that the second storage space, storage space B 228, can be a separate storage space on the same storage device 216 as the first storage space, can be on a separate storage device on the same host machine A 210, and/or may be on a shared storage space, such as the storage pool 170.

The data transfer system 200 facilitates the transfer of data from a first storage space to a second storage space while permitting the user, such as a virtual machine 214 or 224, to access the underlying data during the data transfer so that any downtime of the virtual machine or an application accessing the data during the data transfer is significantly reduced. For example, as discussed above, conventional mechanisms entail a downtime and/or reduced performance to permit modified data to be transferred through an iterative process and/or slow transfer because of duplicative synchronous data modifications. The data transfer system 200 facilitates the data transfer using an access table 262 and a location table 264 to allow a user, such as a virtual machine, to access data stored in two different storage spaces 218, 228 while the data transfer is on-going. By reducing the downtime, the present disclosure optimizes the functioning of host machines and/or the virtual machines running thereon and increases user satisfaction.

Host machine A 210 and host machine B 220 can be analogous to the first node 105 and the second node 110, respectively, discussed with respect to FIG. 1 above. Although each of host machine A 210 and host machine B 220 have been shown as having only their respective hypervisors (e.g., hypervisor 212 and hypervisor 222, respectively) and their respective virtual machines (e.g., virtual machines 214 and virtual machines 224, respectively), each of host machine A 210 and host machine B 220 can have additional components (e.g., the controller/service VM), as discussed above. Further, the number of the virtual machines 214, 224, on each of host machine A 210 and host machine B 220 may vary from one another, as also discussed above.

As shown in FIG. 2, host machine A 210 includes a storage device 216 with an allocated storage space A 218. The allocated storage space A 218 can be an allocated data storage space for a virtual machine of the virtual machines 214 operating on host machine A 210. The storage device 216 may include, but is not limited to, any type of magnetic storage devices (e.g., hard disk, floppy disk, magnetic strips, etc.), optical disks (e.g., compact disk (CD), digital versatile disk (DVD), etc.), smart cards, solid state devices, etc. Similarly, host machine B 220 includes a storage device 226. The storage device 226 may include, but is not limited to, any type of magnetic storage devices (e.g., hard disk, floppy disk, magnetic strips, etc.), optical disks (e.g., compact disk (CD), digital versatile disk (DVD), etc.), smart cards, solid state devices, etc. In some instances, the data stored in storage space A 218 may be transferred or migrated to host machine B 220. Such a transferal may be to facilitate maintenance of the storage device 216, to migrate one or more of the virtual machines 214 to host machine B 220, and/or to utilize a different storage device 226, such as a high performance low-latency storage device.

When a data transfer is to be performed, a new storage space B 228 can be allocated as the second, destination storage space. In some implementations, the new storage space B 228 can be on the storage device 216 of the host machine A 210, on the storage device 226 of a second host machine, such as host machine B 220, or on a shared storage, such as storage pool 170 of FIG. 1. While only two host machines 210, 220 are shown in FIG. 2, in other embodiments, the number of host machines may vary from fewer than two to greater than two.

To facilitate the transfer of data from a first storage space to a second storage space while permitting, the data transfer system 200 includes a storage space transfer tool 250. In some implementations, the storage space transfer tool 250 is implemented on another device, such as a central management system. In other implementations, the storage space transfer tool 250 can be implemented as part of a hypervisor, such as hypervisor 212 or 222. In still other implementations, the storage space transfer tool 250 may be a part of a virtual machine 214, 224. In still other embodiments, the storage space transfer tool 250 may be part of a controller/service VM (e.g., the controller/service VM 130, the controller/service VM 145, the controller/service VM 160 of FIG. 1). Specifically, when part of the controller/service VM (e.g., the controller/service VM 130, the controller/service VM 145, the controller/service VM 160), the storage space transfer tool 250 may reside within the local management system (e.g., Prism Element) of the controller/service VM. Further, in some embodiments, an instance of the storage space transfer tool 250 may be located on the controller/service VM of each node (e.g., the first node 105, the second node 110, and the third node 115). In yet other embodiments, the storage space transfer tool 250 may be part of another component within or associated with the virtual computing system (e.g., the virtual computing system 100). Thus, the location of the storage space transfer tool 250 within the virtual computing system may vary from one embodiment to another.

Further, although not shown, the storage space transfer tool 250 may be configured as hardware, software, firmware, or a combination thereof. Specifically, the storage space transfer tool 250 may include one or more processing units configured to execute instructions and one or more memory units to store those instructions and other conversion related data. In some embodiments, the storage space transfer tool 250 may be connected to a storage pool (e.g., the storage pool 170) to receive, send, and process information, and to control the operations of the data transfer. The instructions may be carried out by a special purpose computer, logic circuits, or hardware circuits of the storage space transfer tool 250. The processing units may, thus, be implemented in hardware, firmware, software, or any combination thereof. The processing units execute an instruction, meaning that they perform the operations called for by that instruction. The processing units may retrieve a set of instructions from a memory (e.g., the storage pool 170 or any other memory associated with the migration tool in which such instructions may be stored). For example, in some embodiments, the processing units may retrieve the instructions from a permanent memory device like a read only memory (ROM) device and copy the instructions in an executable form to a temporary memory device that is generally some form of random access memory (RAM). The ROM and RAM may both be part of the storage pool (e.g., the storage pool 170), or in some embodiments, may be separately provisioned from the storage pool. Further, the processing units may include a single stand-alone processing unit, or a plurality of processing units that use the same or different processing technology. The instructions may be written using one or more programming language, scripting language, assembly language, etc.

Referring still to FIG. 2, the storage space transfer tool 250 includes a plurality of components for facilitating the data transfer from the first storage space to the second storage space. For example, the storage space transfer tool 250 includes a storage space transfer system 260 and, optionally, a user interface 270. Similar to the storage space transfer tool 250, the storage space transfer system 260 may be configured as hardware, software, firmware, or a combination thereof having one or more processing units configured to execute instructions for facilitating the data transfer from the first storage space to the second storage space.

The storage space transfer tool 250 includes a user interface 270. The user interface 270 is used to receive an input or data transfer indication from a user to transfer or migrate data from the first storage space to a second storage space. The user interface 270 may present one or more displays to the user presenting an option (e.g., as a menu item) to designate the first storage space to be transferred and the second, destination storage space to which the data is to be transferred. The user may interact with the option to start the data transfer process. Upon receiving the indication (e.g., input) from the user to start the data transfer process, the user interface 270 may send an indication to the storage space transfer system 260. In response to receiving the indication from the user interface 260, the storage space transfer system 260 starts the process for transferring the data from the first storage space to the second storage space. In some implementations, the storage space transfer system 260 can receive other indications from other systems to automatically start the data transfer process without utilizing user input via the user interface 270. In further embodiments, the user interface 270 can include diagnostic interfaces, such as a visualization of the access table 262, a visualization of the location table 264, a status or progress indicator for the transfer process, data indicative of one or more values associated with the transfer process (e.g., remaining amount of data to be transferred, the amount of data transferred, a data transfer rate, etc.).

The storage space transfer system 260 implements the data transfer process. In some implementations, the storage space transfer system 260 can store the access table 262 and location table 264 during the transfer process. In some implementations, the storage space transfer system 260 includes a copier 266. In other implementations, the copier 266 may be separate from the storage space transfer system 260. The storage space transfer system 260 identifies the first storage space 218 storing the current data and a second, destination storage space 228. If the second, destination storage space 228 is not established, the storage space transfer system 260 can allocate a storage space for the second, destination storage space 228 on a particular storage device, such as the storage device 226 of a destination host machine B 210. The storage space transfer system 260 also creates two tables, such as bitmaps or other tabular representations, such as those shown in FIGS. 3-4, for the access table 262 and the location table 264. The location table 264 indicates whether the latest version of the data is at the first storage space 218 or at the second, destination storage space 228. The access table 262 indicates whether a particular range of the to-be-transferred dataset (e.g., a block device sector) is currently in use or being copied. If a particular dataset is indicated as in-use by the access table 262, then access to the data and the corresponding regions of the location table 264 is prevented while in use or being copied.

Figure 3:
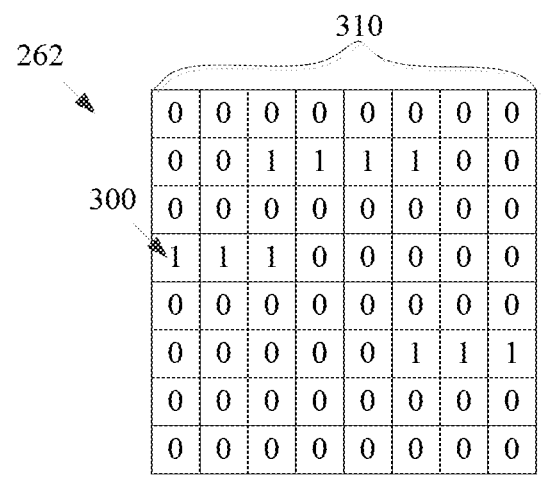
FIG. 3 is block diagram of an example access table, in accordance with some embodiments of the present disclosure.

When data is being accessed, the corresponding range is automatically annotated on the access table 262. As noted above, the access table 262 can be any tabular format, including bitmaps. The representation of an example access table 262 is shown in FIG. 3 having several access values 300 representative of sections of data. The sections of data can be block device sectors, bytes, files, or any other segment of data. In some implementations, the sections of data represented by the access values 300 can be different sizes. The access value 300 in the access table 262 for a particular section of data is assigned a bit value of 1 if the corresponding section of the data is in use, either by a user or by the copier 266. Similarly, the access value 300 in the access table 262 for a particular section of data is assigned a bit value of 0 if the corresponding section of the data is not in use, either by a user or by the copier 266.

If any part of an access range 310 is already annotated, then the data range 310 is either currently in use or being copied by the copier 266. If the access range 310 is in use by a user, then the copier 266 can skip over the access range 310 until the access values 300 indicate the access range 310 is no longer in use. In some implementations, the copier 266 can proceed through any remaining access ranges 310 and return to the skipped access range 310 after cycling through the later access ranges 310 in the access table 262. If the access range 310 is in use by the copier 266 and a request to access the data in the access range 310 is sent by a user, then the user, such as a virtual machine, can be set into a waiting list by the storage space transfer system 260 and the request sleeps or waits until the copier 266 completes the copying of the data for the access range 310. If a full access range 310 is successfully annotated while the copier 266 is proceeding (e.g., the access range 310 is set to all 1 bit values), then access to the access range 310 and any access values 300 for particular sections of data can be reset to 0 bit values to allow access to the underlying data since the copying to the second, destination storage space 228 has been completed.

If the requested data is not in use based on the access table 262, then the location table 264 is consulted. For any requests to write or modify the underlying data, all data is sent to the second, destination storage space 228 and the location table 264 is updated accordingly as discussed below. For any requests to read the underlying data, the location table 264 is consulted to determine where the data must be read from, either from the first storage space 218 or the second, destination storage space 228. Thus, the storage space transfer system described herein advantageously accesses both storage spaces 218, 228 during the data transfer process to minimize data transfers, write/read operations, storage space utilization, and transfer time.

Figure 4:
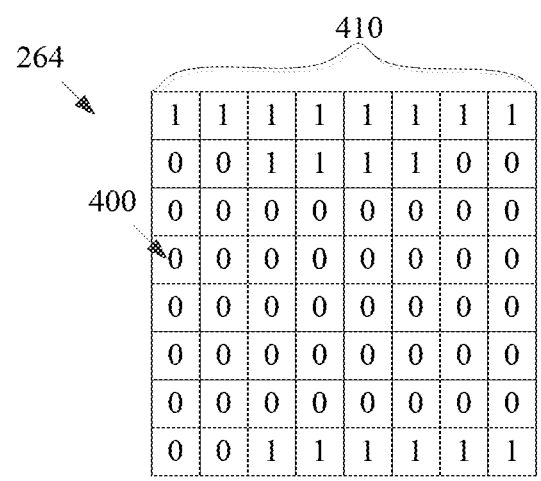
FIG. 4 is block diagram of an example location table, in accordance with some embodiments of the present disclosure.

The location table 264 can be any tabular format, including bitmaps. The representation of an example location table 264 is shown in FIG. 4 having several location values 400 representative of sections of data. The sections of data can be block device sectors, bytes, files, or any other segment of data. In some implementations, the sections of data represented by the location values 400 can be different sizes. The location value 400 in the location table 264 for a particular section of data is assigned a bit value of 0 if the corresponding section of the data is located at the first storage space 218. Similarly, the location value 400 in the location table 264 for a particular section of data is assigned a bit value of 1 if the corresponding section of the data is located at the second, destination storage space 228.

If any part of a location range 410 is already annotated, then the data range 410 is either currently being copied by the copier 266 or completely moved to the second, destination storage space 228. If a full location range 410 is successfully annotated while the copier 266 is proceeding (e.g., the location range 410 is set to all 1 bit values), then the underlying data have been completely copied to the second, destination storage space 228.

The data copier 266 access and updates both the access table 262 and the location table 264. When data is being copied by the copier 266, the corresponding access values 300 of the relevant access range 310 are automatically annotated by the copier 266 in the access table 262. If any part of the access range 310 is already annotated, then the access range 310 is being accessed. The copier 266 skips any access ranges 310 that are in use and proceeds to the next access range 310. If the full access range 310 is not in use, then the copier 266 checks the location table 264 to determine if the underlying data has been copied to the second, destination storage space 228. If the underlying data has not been copied, then the copier 266 sets the values 300 to in use (e.g., 1 bit values) and copies any data that is still present at the first storage space 218. When the copy completes, the location table 264 is updated accordingly and the access range 310 and any access values 300 for particular sections of data can be reset to 0 bit values to allow access to the underlying data since the copying to the second, destination storage space 228 has been completed. At this point, if a user process is present on a waiting list, a notification is sent to the user to be woken up to access the underlying data from the second, destination storage space 264. The procedure continues until the entire location table 264 indicates that all data is present at the second, destination storage space 228.

It is to be understood that only some components of the storage space transfer tool 250 are shown and described herein. Nevertheless, other components that are considered desirable or needed to perform the functions described herein are contemplated and considered within the scope of the present disclosure.

Figure 5:
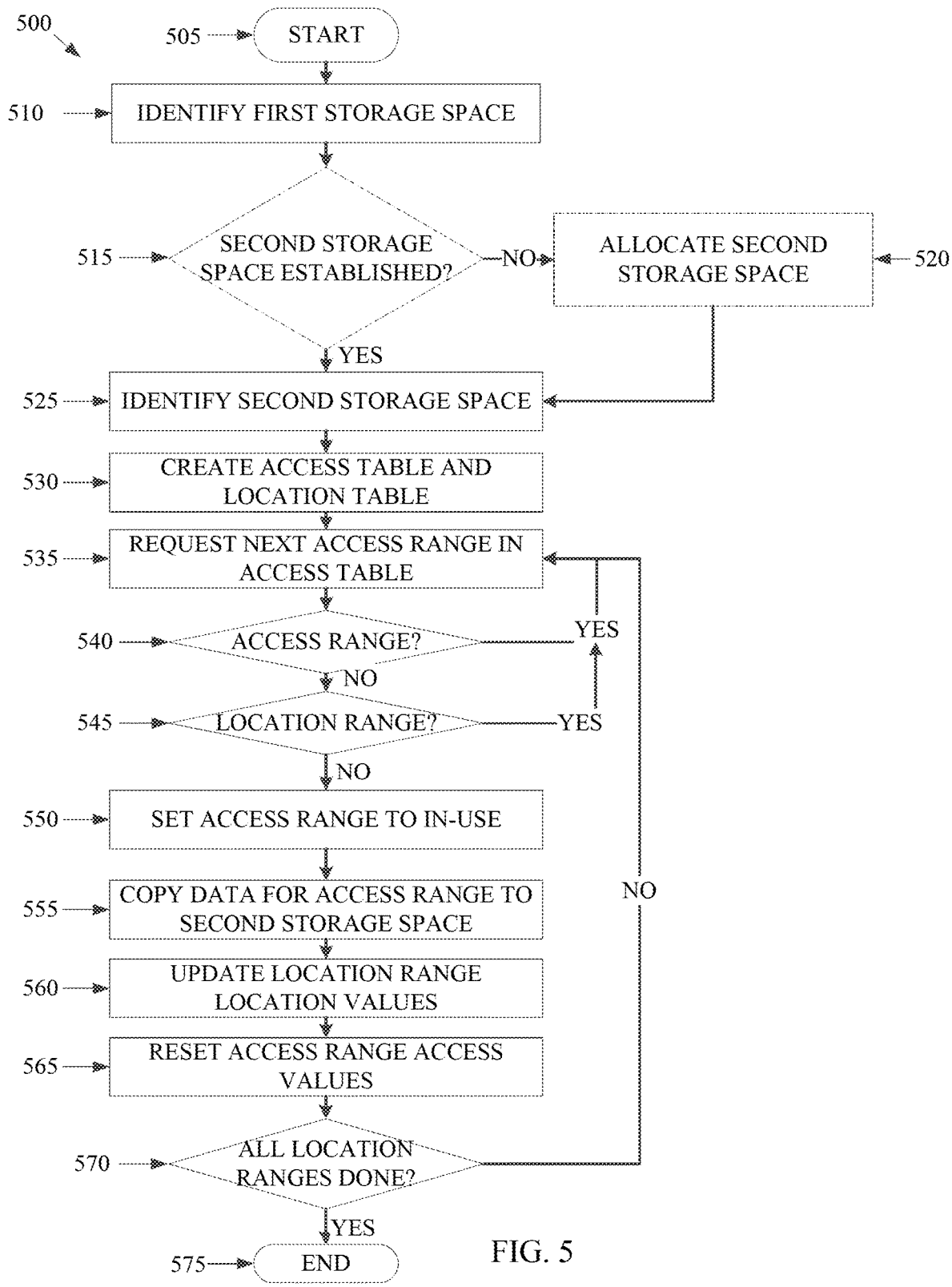
FIG. 5 is an example flowchart outlining operations for transferring data of a storage space while permitting use of the virtual computing system of FIG. 1, in accordance with some embodiments of the present disclosure.

Turning now to FIG. 5, a flowchart outlining a process 500 for transferring data of a storage space while permitting use, in accordance with some embodiments of the present disclosure. The process 500 may include additional, fewer, or different operations, depending on the particular embodiment. Further, the process 500 is described in conjunction with FIGS. 2-4. Thus, the process 500 is used for transferring data of a storage space while permitting use of an underlying computing system, such as transferring data for a virtual computing system from a first storage space 218 to a second, destination storage space, such as second storage space 228.

The process 500 starts at operation 505 with the storage space transfer system 260 of the storage space transfer tool 250 receiving a request to transfer a storage space from a first storage space to a second, destination storage space. In some implementations, the request can be a user request via the user interface 270 that identifies the first storage space and the second, destination storage space. In other implementations, the request may be received from another system in communication with the storage space transfer tool 250. The process 500 includes identifying the first storage space 510, such as via a pointer to a physical storage device and/or sectors of a physical storage device where the first storage space is located.

In some implementations, upon receiving the request to transfer a storage space from a first storage space to a second, destination storage space, the storage space transfer system 260 may optionally verify that certain pre-requisites for the transfer have been satisfied. For example, in some embodiments, the process 500 can optionally include determining if the second storage space has been established 515, such as via a pointer to a physical storage device and/or sectors of a physical storage device where the second storage space is located. If the second storage space has not been established, the process 500 can include allocating a second storage space 520. The allocation may include setting a pointer to a second physical storage device on which the second storage space is to be stored and/or a pointer to a different location on the first physical storage device.

Additionally, the storage space transfer system 260 may determine that the second, destination storage space is accessible and/or has storage capacity for the data from the first storage space. The storage space transfer system 260 may perform additional and/or other checks to verify the suitability of the second storage space. In other embodiments, the above checks may be skipped. The process 500 further includes identifying the second storage space 525, such as via the pointers described above indicating the physical storage device locations for the second storage space.

Although the storage space transfer system 260 have been described above as performing pre-requisite checks, in other embodiments, another component of the storage space transfer tool 250 may perform these checks. In such cases, the storage space transfer system 260 can start the transfer process upon receiving an indication from such other component that the pre-requisite checks have been satisfactorily completed. Thus, upon confirming that all pre-requisite checks for the transfer are satisfactorily completed or if the pre-requisite checks are not used, the storage space transfer system 260 starts the transfer of data from the first storage space to the second storage space. During transfer process, a user, such as a virtual machine or other computing device, can keep running in a normal manner by accessing and/or modifying any data that is not being transferred by a copier 266. Thus, the operations described herein do not significantly impact the use of the underlying data during the transfer. In fact, the user may continue operating normally during a significant portion of the transfer process.

The process 500 includes creating an access table 262 and a location table 264 to be referenced during the process 500 for copying and/or using data during the transfer process 500. The data represented by the access ranges 310, location ranges 410, access values 300, and location values 400 can be associated with one or more portions of data stored in the first storage space, such as block sectors, files, bytes, etc. The data represented by the ranges 310, 410 and values 300, 400 can also vary in size, though the data represented by corresponding access ranges 310 and location ranges 410 and/or access values 300 and location values 400 are the same size. Initially the access values 300 are all set to a first access value, such as 0 bit value, indicative of the data not currently being in use. Similarly, the location values 400 are all set to a first location value, such as 0 bit value, indicative of the data currently being located in the first storage device. If data is accessed, either by a user or by the copier, then the storage space transfer system 260 sets a corresponding access value 300 to a second access value, such as a 1 bit value, indicative of the underlying data being in use.

The process 500 includes requesting a next access range 310 in the access table 262, 535, and determining if any of the access values 300 indicate that data within the access range 310 is in use 540. If the access values 300 in the access range 310 indicate that the underlying data is not in use, then the process 500 proceeds to determine if the corresponding location values 400 for a corresponding location range 410 indicate that the underlying data is located at the second storage space 545. The location values 400 can be a first location value, such as a 0 bit value, if the underlying data is located in the first storage space and a second location value, such as a 1 bit value, if the underlying data is located in the second storage space. In some implementations, a separate map of pointers to specific physical locations of the underlying data can be maintained to be accessed to retrieve and/or modify the stored data.

If the location values 400 for the corresponding location range 410 indicates that the underlying data has already been transferred to the second storage space, then the process 500 returns to request 535 the next access range 310 in the access table 262. If all or part of the underlying data has not been transferred from the first storage space to the second storage space based on the location values 400 of the corresponding location range 410 in the location table 264, then the process 500 proceeds to set the access values 300 for the access range 310 to the second access value indicative of the underlying data being in use for copying. The copier 266 copies the underlying data from the first storage space to the second storage space 555. Once the copier 266 has completed copying the underlying data, each of the location values 400 of the corresponding location range 410 of the location table 264 are modified to indicate the underlying data is now stored in the second storage space 560.

The process 500 proceeds to reset the access values 300 of the corresponding access range 310 to the first access value to indicate the underlying data is no longer in use. During the preceding operations, 550 through 565, if a request to access the underlying data is received during the copying, the request can be queued in a waiting list. The storage space transfer system 260 can respond to the queued waiting list requests after the access values 300 are reset to allow the user to access the underlying data from the new second storage space location.

The process 500 includes determining if all the location values 400 in the location table 264 have been updated to indicate all the underlying data is transferred to the second storage space 570. If there are location values 400 indicating data is still stored in the first storage space, the process 500 returns to request a new access range 310 in the access table 262 at operation 535. If all location values 400 indicate all the underlying data has been transferred to the second storage space, the process 500 proceeds to end 575.

Figure 6:
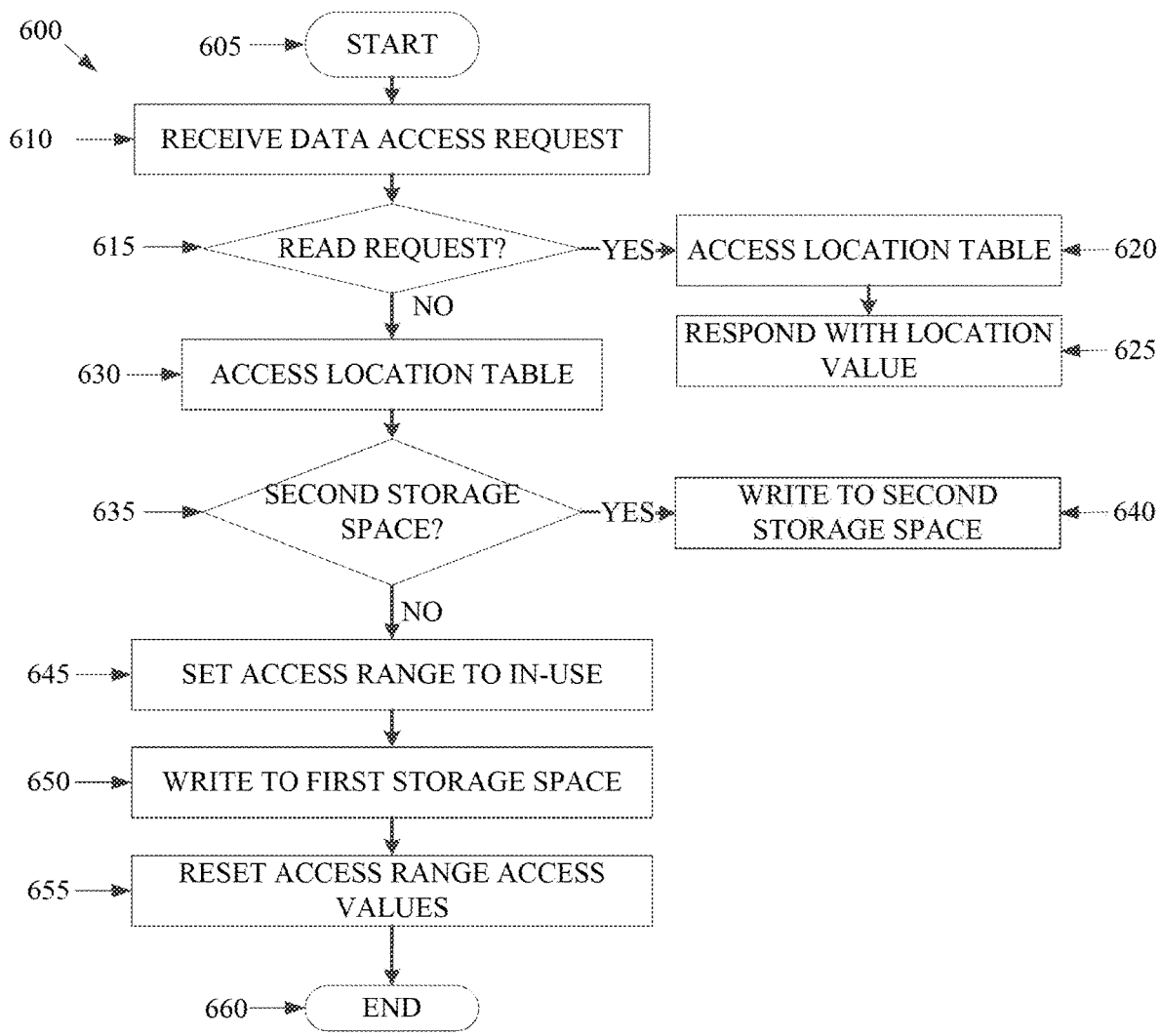
FIG. 6 is an example flowchart outlining operations for accessing data of two storage spaces while permitting use of the virtual computing system of FIG. 1, in accordance with some embodiments of the present disclosure.

Since the user, such as a virtual computing system or other computing system, is still running and reading or writing data, the storage space transfer system 260 can also control the reading and writing based on the location of the underlying data using the location table 264. FIG. 6 depicts a process 600 to read and/or write data during the transfer process 500. Additional, fewer, or different operations may be performed in the process 600 depending on the embodiment. The process 600 starts 605 by receiving a data access request 610. A determination of whether the access request is a read request 615 is made. If the request is a read request, then the location table 264 is accessed 620 and the corresponding location value 400 for the requested data is used 625 for reading the underlying data. If the responded value is a first location value, such as a 0 bit value, then the underlying data is stored in the first storage space. If the responded value is a second location value, such as a 1 bit value, then the underlying data is stored in the second storage space.

If the request received is not a read request, such as a write request, then the location table 264 is accessed 620 and a determination 635 is made whether the corresponding location value 400 corresponds to a second location value indicative of the data being stored in the second storage space. If the location value 400 is the second location value, then the write request is used to write to the second storage space 640. If the location value 400 is the first location value, then the access value 300 for the underlying data in the access table 262 is set to a second access value, such as a 1 bit value, indicative of the underlying data being in use 645. The write request is then used to write to the first storage space 650. When the write request is finished, then the access value 300 for the underlying data in the access table 262 is set to a first access value, such as a 0 bit value, indicative of the underlying data no longer being in use 655.

The process 600 ends 660. In some implementations, the process 600 can repeat for each data access request.

By allowing access to the underlying data during the data transfer process 500 using the process 600, downtime for a user, such as a virtual machine, is greatly reduced in that the computing system may continue operating during the transfer process. Thus, the transfer of data from the first storage space to a second storage space can occur as a background process that has minimal impact on the operation of the computing system. Moreover, by selecting small portions of data for the ranges 310, 410, the delay for requests to access the underlying data can be reduced to a minimum where the data transfer speed is high and the incremental transferred data ranges are small.

Figure 7A:
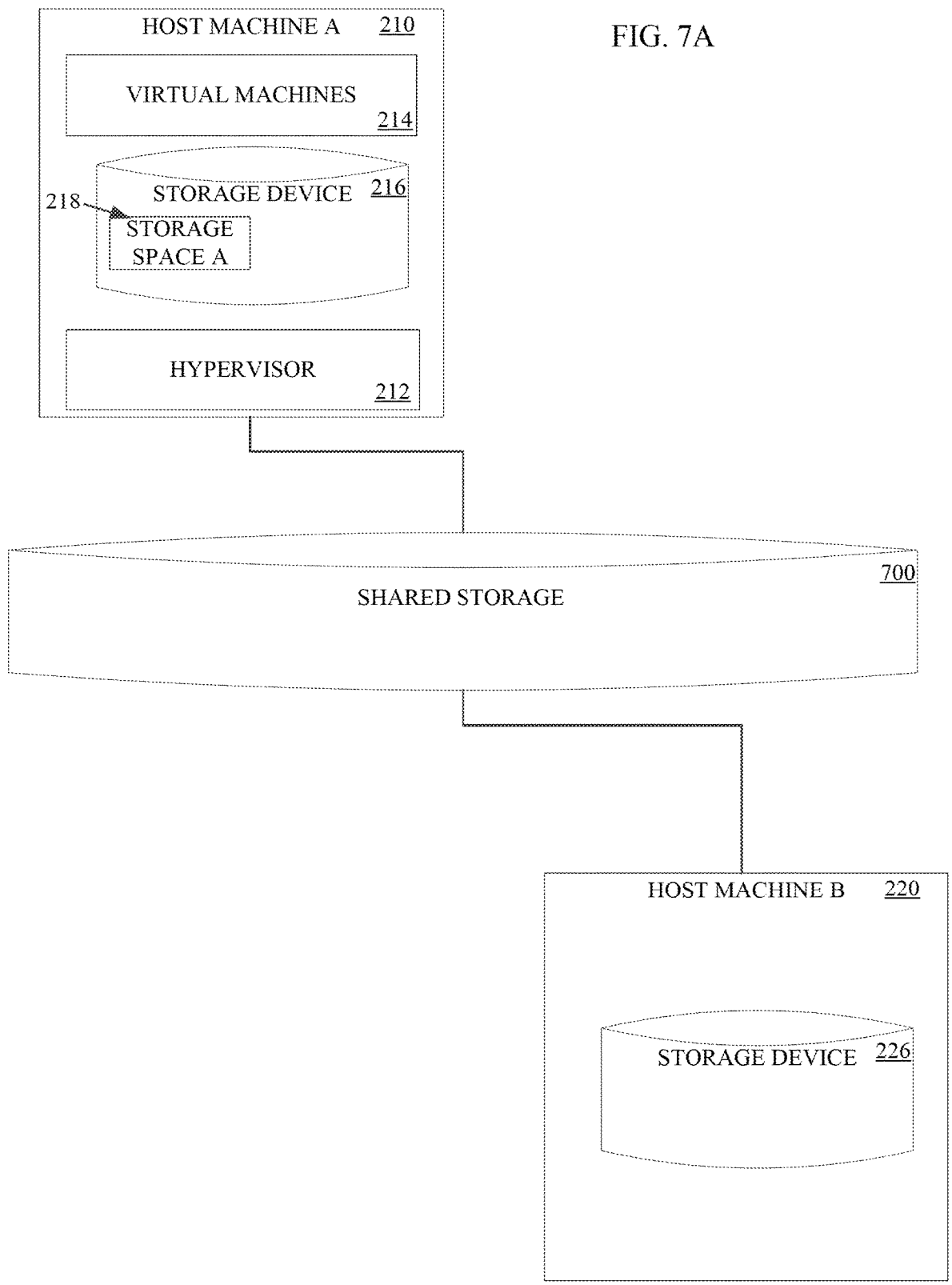
FIGS. 7A-7C are block diagrams of example virtual machines with virtual disks being migrated from a first host machine to a second host machine, in accordance with some embodiments of the present disclosure.
Figure 7B:
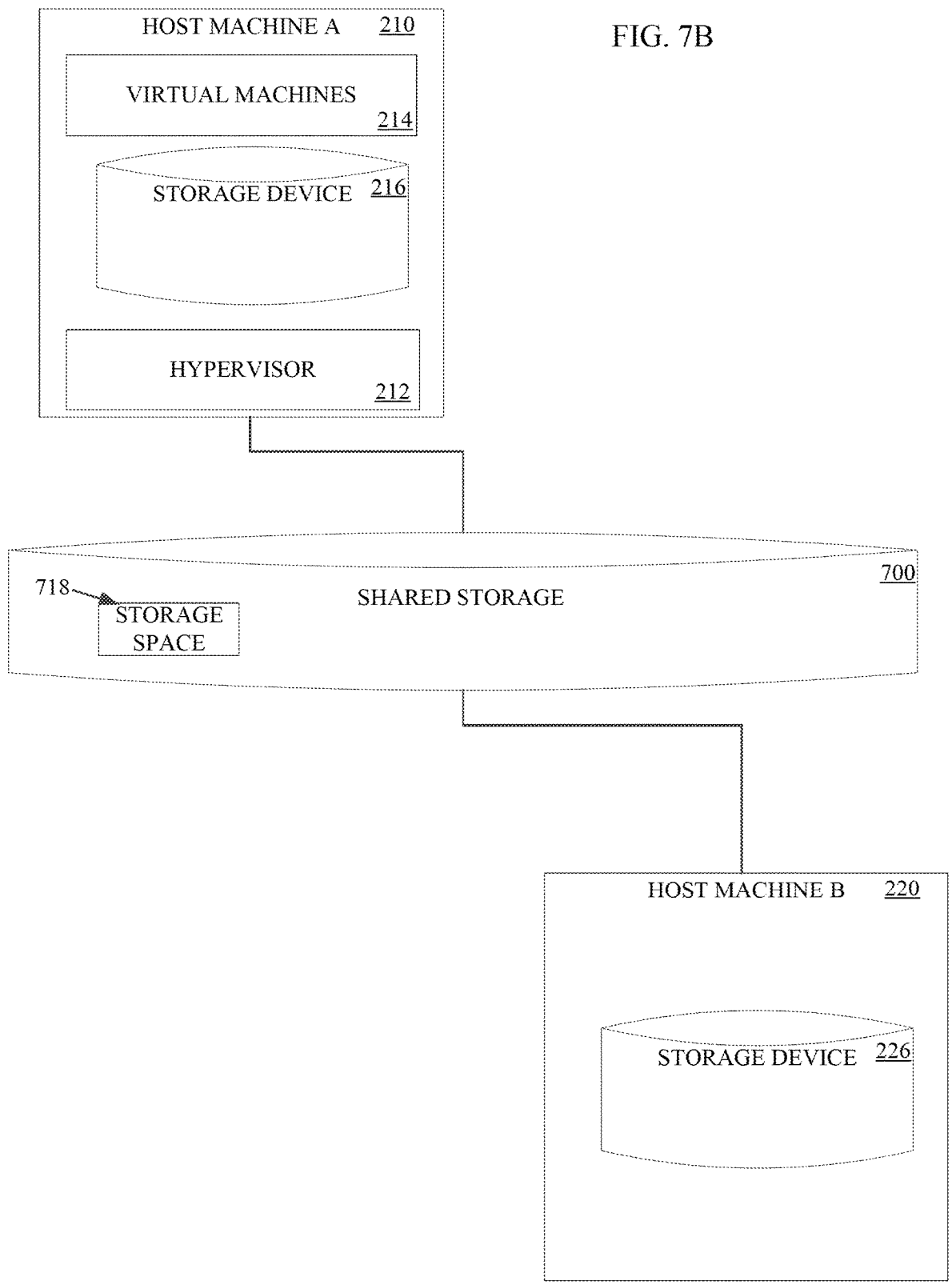
Figure 7C:
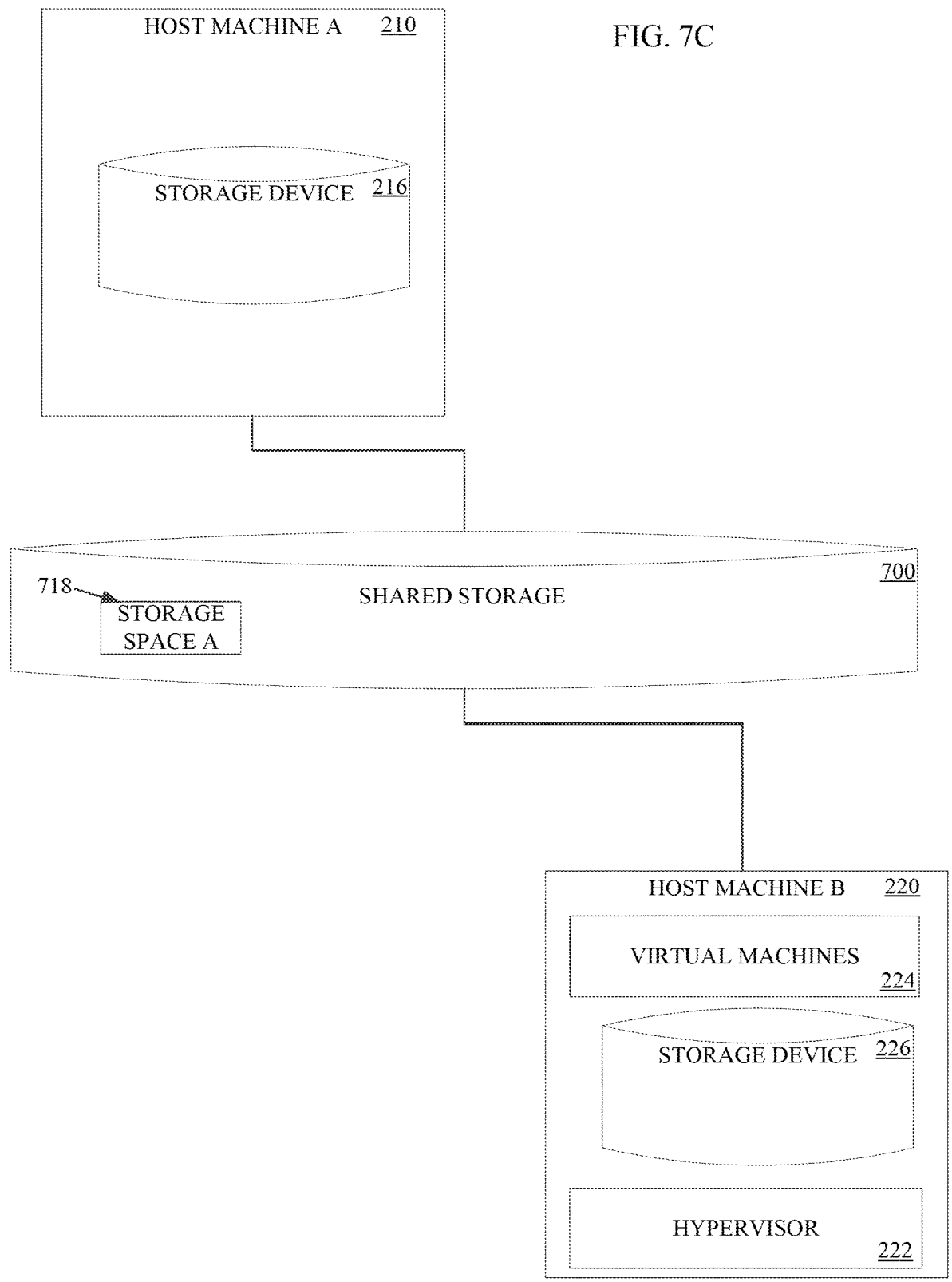

FIGS. 7A-7C depict an implementation of a migration of a virtual disk from a virtual machine on a first host machine, such as host machine A 210, to a shared storage space 700. Once the transfer is complete, the virtual disk is usable by any host machines with access to the shared storage space 700. The virtual machine 214 on host machine A 210 can still access and utilize the virtual disk now located in the shared storage space 700, such as to permit usage while preparing to migrate the virtual machine 214 from host machine A 210 to a second host machine, such as host machine B 220. When virtual machine 214 is migrated to host machine B 220, as virtual machine 224, the virtual machine 224 can maintain access and usage of the virtual disk on the shared storage space 700. In some implementations, another transfer of the virtual disk can follow from the shared storage space 700 to a local storage device 226 in a similar manner to transferring the virtual disk from host machine A 210 to the shared storage space 700

Referring to FIG. 7A, host machine A 210 is analogous to host machine A 210 discussed with respect to FIG. 2 above. Host machine B 220 is analogous to host machine B 220 of FIG. 2, but without virtual machines 224 or a hypervisor 222 operating on the host machine. Host machine A 210 includes a storage device 216 with an allocated storage space A 218. The allocated storage space A 218 can be an allocated data storage space for a virtual machine operating on host machine A 210. The storage device 216 may include, but is not limited to, any type of magnetic storage devices (e.g., hard disk, floppy disk, magnetic strips, etc.), optical disks (e.g., compact disk (CD), digital versatile disk (DVD), etc.), smart cards, solid state devices, etc. Similarly, host machine B 220 includes a storage device 226. The storage device 226 may include, but is not limited to, any type of magnetic storage devices (e.g., hard disk, floppy disk, magnetic strips, etc.), optical disks (e.g., compact disk (CD), digital versatile disk (DVD), etc.), smart cards, solid state devices, etc. In the present configuration, the virtual disk of storage space A 218 is visible only to host machine A 210 and is not visible to host machine B 220 or any other host machines unless otherwise permitted.

When a virtual machine 214 on host machine A 210 is to be migrated, typically the storage space for the virtual machine is directly transferred to another host machine, such as host machine B 220. However, in some instances, it may be advantageous to transfer the storage space 218 for a virtual disk of the host machine A 210 to a shared storage space 700, such as shown in FIG. 7B. The shared storage space 700 can be a cloud storage space, a network storage space, or any other shared storage arrangement. When the transfer to the shared storage space 700 is complete, the virtual disk is advantageously usable by all host machines with access to the shared storage space 700. Thus, if the virtual machine 214 operating on the host machine A 210 cannot be migrated host machine B 220, but could be migrated to another host machine, then the transfer of the storage space A 218 to the shared storage space 700 advantageously permits migration of the virtual machine 214 to any other host machine while maintaining access and usage of the underlying data stored on the shared storage space 700.

As shown in FIG. 7B, the storage space A 218 for the virtual disk can be transferred to an allocated storage space 718 in the shared storage space 700 according to the process described above in reference to FIGS. 2-6. The virtual machine 214 can be updated to direct read and write requests to the transferred storage space 718 on the shared storage space 700. Thus, even if the virtual machine 714 cannot be migrated to a new host machine, such as host machine B 220, the virtual machine 214 operation is not affected because of the condition of host machine B 220. Moreover, by transferring the virtual disk to the shared storage space 700, the shared storage space 700 can provide extra resilience and be used as a backup location in the event of a failure of the host machine A 210 and/or be used by a hypervisor on the destination host machine if the local storage for the destination host machine is unavailable or space is low.

As shown in FIG. 7C, the virtual machine 214 of host machine A 210 can be migrated to the second host machine, host machine B 220, while maintaining access and use of the storage space 718 on the shared storage space 700. In some implementations, the data of the storage space 718 in the shared storage space 700 can subsequently be transferred to host machine B 220 using the process described in reference to FIGS. 2-6.

Figure 8:
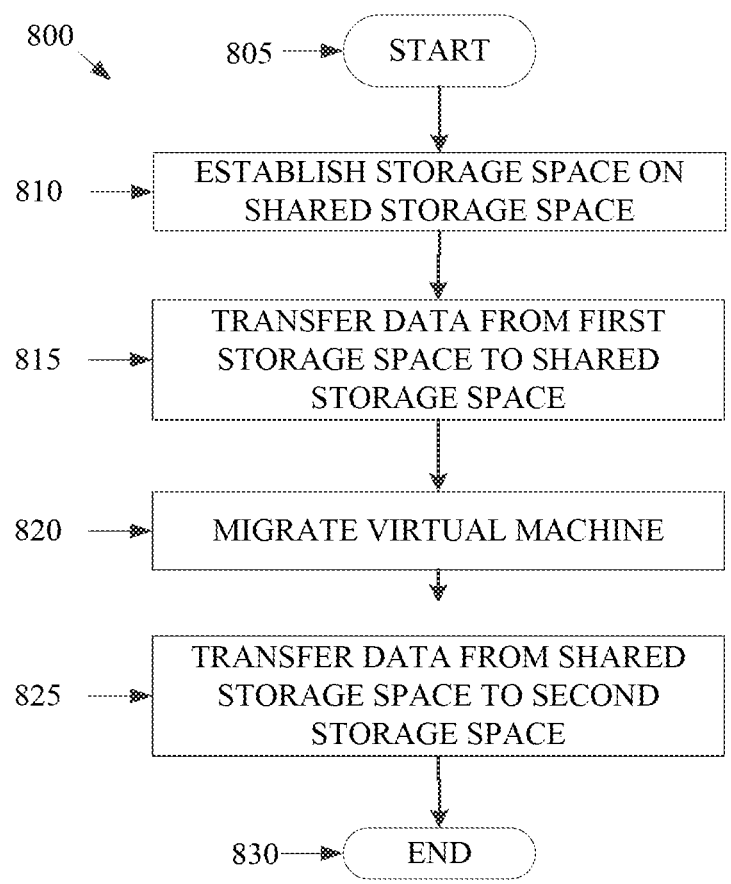
FIG. 8 is an example flowchart outlining operations for migrating a virtual machine while permitting use of virtual disks, in accordance with some embodiments of the present disclosure.

FIG. 8 depicts a process 800 for migrating a virtual machine from a first host machine to a second host machine by using a shared storage space, such as shown in FIGS. 7A-7C. The process 800 starts 805 and includes establishing a storage space on a shared storage space 810. The data from the first host machine, such as host machine A 210, is transferred to the shared storage space 815 via the transfer process described in reference to FIGS. 2-6. In some implementations, the process 800 can end once the data is transferred to the hared storage space 700. The virtual machine on the first host machine can access, read, and write to the data of the virtual disk in the storage space of the shared storage space with minimal performance deterioration.

Optionally, the process 800 can continue with migrating a virtual machine from the first host machine to a second host machine 820. The migration of the virtual machine from the first host machine to the second host machine may be performed according to any known methods. The virtual machine on the second host machine can also access, read, and write to the data of the virtual disk in the storage space of the shared storage space with minimal performance deterioration. In some implementations, the process 800 can further include transferring the data from the storage space of the shared storage space 700 to a storage device 226 of the second host machine 825 according to the transfer process described in reference to FIGS. 2-6. The process 800 then ends 830.

Thus, the present disclosure provides a system and method for migrating virtual machines and transferring data from a first storage space to a second storage space in an efficient, easy, and automatic manner. The downtime for a user, such as a virtual machine or another computing device, during the data transfer process is minimized while permitting use of the underlying data that is not in the process of being transferred.

Although the present disclosure has been described with respect to software applications, in other embodiments, one or more aspects of the present disclosure may be applicable to other components of the virtual computing system 100 that may be suitable for real-time monitoring by the user.

It is also to be understood that in some embodiments, any of the operations described herein may be implemented at least in part as computer-readable instructions stored on a computer-readable memory. Upon execution of the computer-readable instructions by a processor, the computer-readable instructions may cause a node to perform the operations.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. A method comprising:
    receiving a request to migrate a virtual machine from a first host machine to a second host machine;
    transferring data associated with the virtual machine from the first host machine to a shared storage space in response to the request, wherein the shared storage space is separate from and shared by the first host machine and the second host machine;
    preventing access to at least a portion of the data during the transfer from the first host machine to the shared storage space;
    allowing access to the portion of the data in the shared storage space after the transfer;
    creating an access data structure on the first host machine for the data before the transfer, the access data structure having an access value indicative of whether the data is in use on the first host machine; and
    determining that the access value is set to a first value before starting the transfer, wherein the first value is indicative of the data not being in use.

2. The method of claim 1 further comprising:
    migrating the virtual machine from the first host machine to the second host machine,
    wherein the virtual machine on the second host machine accesses the data in the shared storage space.

3. The method of claim 1 further comprising:
transferring the data from the shared storage space to a storage space on the second host machine.

4. The method of claim 1, further comprising directing a request to read the data or update the data to the shared storage space after the transfer.

5. The method of claim 1, further comprising:
determining that the access value is set to a second value in response to the request, wherein the second value is indicative of the data being in use; and
waiting for the access value to change to a first value before starting the transfer, wherein the first value is indicative of the data not being in use.

6. The method of claim 1, further comprising:
changing the access value to a second value indicative of the data being in use; and
changing the access value back to the first value after the transfer.

7. The method of claim 1, further comprising:
creating a location data structure on the first host machine for the data before the transfer, wherein the location data structure comprises a location value indicative of the data being on the first host machine or the shared storage space.

8. The method of claim 7, further comprising determining based upon the location value that the data is on the first host machine before starting the transfer.

9. The method of claim 7, further comprising changing the location value of the data from a first value before the transfer to a second value after the transfer,
wherein the first value is indicative of the data being on the first host machine; and
wherein the second value is indicative of the data being on the shared storage space.

10. A method comprising:
receiving a request to migrate a virtual machine from a first host machine to a second host machine;
determining from an access data structure on the first host machine that data of the virtual machine is not in use;
determining from a location data structure on the first host machine that the data is located on the first host machine; and
transferring the data from the first host machine to a shared storage space that is separate from and shared by the first host machine and the second host machine.

11. The method of claim 10 further comprising:
migrating the virtual machine from the first host machine to the second host machine,
wherein the virtual machine on the second host machine accesses the data in the shared storage space.

12. The method of claim 10 further comprising:
transferring the data from the shared storage space to a storage device of the second host machine upon migrating the virtual machine from the first host machine to the second host machine.

13. The method of claim 10, further comprising:
determining from the access data structure that the data is not in use in response to a read request; and
reading the data from the first host machine upon the location data structure indicating that the data is on the first host machine and from the shared storage space upon the location data structure indicating that the data is on the shared storage space.

14. The method of claim 10, further comprising:
determining from the access data structure that the data is not in use in response to a request to update the data; and
updating the data on the first host machine upon the location data structure indicating that the data is on the first host machine and on the shared storage space upon the location data structure indicating that the data is on the shared storage space.

15. The method of claim 10, further comprising:
changing an access value of the access data structure during the transfer to indicate that the data is in use; and
changing the access value of the access data structure after the transfer to indicate that the data is no longer in use.

16. The method of claim 10, further comprising:
receiving a request by the first host machine to perform an operation on the data after the transfer; and
forwarding the request to the shared storage space for completion.

17. The method of claim 10 further comprising:
Creating a second access data structure and a second location data structure for the data on the shared storage, the second access data structure indicative of whether the data is in use in the shared storage space, the second location data structure indicative of whether the data is located in the shared storage space or the second host machine.

18. The method of claim 17, further comprising:
determining from the second access data structure that the data is in use in response to receiving a request to read or update the data in the shared storage space; and
waiting for the second access data structure to indicate that the data is no longer in use before completing the request.

19. The method of claim 17, further comprising:
determining from the second access data structure that the data is not in use in response to receiving a request to read or update the data in the shared storage space; and
completing the request from the shared storage upon the second location data structure indicating that the data is in the shared storage space or from the second host machine upon the second location data structure indicating that the data is on the second host machine.

20. An apparatus comprising a non-transitory memory having programmed instructions that when executed cause the apparatus to:
receive an indication of a virtual machine migration from a first host machine to a second host machine;
determine that an access value associated with data of the virtual machine is set to a first access value in an access data structure, the first access value indicative of the data not being in use;
determine that a location value associated with the data is set to a first location value in a location data structure, the first location value indicative of the data being on the first host machine before the transfer; and
transfer the data from the first host machine to a shared storage space that is shared by and separate from the first host machine and the second host machine.

21. The apparatus of claim 20, further comprising programmed instructions that when executed cause the apparatus to:
determine that the access value is set to the first access value in response to receiving a read request to read the data; and
read the data from the first host machine or the shared storage space based upon the location value.

22. The apparatus of claim 20, further comprising programmed instructions that when executed cause the apparatus to:

determine that the access value is set to a second access value in response to receiving a request to read the data; and wait until the access value is set to the first access value before reading the data.

23. The apparatus of claim 20, further comprising programmed instructions that when executed cause the apparatus to:

determine that the access value is set to the first access value in response to receiving a request to update the data; and update the data in the first host machine based upon the location value indicative of the data being in the first host machine or update the data in the shared storage space based upon the location value indicative of the data being the shared storage space.

24. The apparatus of claim 20, further comprising programmed instructions that when executed cause the apparatus to:

determine that the access value is set to the second access value in response to receiving a request to update the data; and wait until the access value is set to the first access value before updating the data.

25. A non-transitory computer readable memory storing computer program code to cause a computer to perform a method comprising:

determining, in response to receiving a request to migrate data from a first storage space to a second storage space, from an access data structure on the first storage space that the data is not in use;

determining from a location data structure on the first storage space that the data is located on the first storage space;

transferring the data from the first storage space to a third storage space, wherein the third storage space is separate from and shared by the first storage space and a second storage space; and transferring the data from the third storage space to the second storage space.

26. The non-transitory computer readable memory of claim 25, wherein the first storage space is a storage device on a first host machine and the second storage device is a storage device on a second host machine.

27. The non-transitory computer readable memory of claim 26, wherein the data is transferred from the first host machine to the third storage space in response to receiving a request to migrate a virtual machine associated with the data to the second host machine.

28. The non-transitory computer readable memory of claim 27, wherein the virtual machine on the second host machine accesses the data in the shared storage space.

29. The non-transitory computer readable memory of claim 25, further comprising: changing an access value in the access data structure to indicate that the data is in use during the transfer; and changing the access value to indicate that the data is no longer in use after the transfer.

30. The non-transitory computer readable memory of claim 25, further comprising changing a location value in the location data structure to indicate that the data is in the third storage space after the transfer.

31. The non-transitory computer readable memory of claim 25, further comprising creating a second access data structure and a second location data structure for the data on the third storage space, wherein the second access data structure is indicative of whether the data is in use on the third storage space, and wherein the second location data structure is indicative of whether the data is located on the third storage space or the second storage space.

32. A method comprising:

receiving a request to migrate a virtual machine from a first host machine to a second host machine;

transferring data associated with the virtual machine from the first host machine to a shared storage space in response to the request, wherein the shared storage space is separate from and shared by the first host machine and the second host machine;

preventing access to at least a portion of the data during the transfer from the first host machine to the shared storage space;

allowing access to the portion of the data in the shared storage space after the transfer;

creating an access data structure on the shared storage space for the data after the transfer, wherein the access data structure comprises an access value indicative of whether the data is in use in the shared storage space;

determining that the access value is set to a first value indicative of the data not being in use before transferring the data from the shared storage space to the second host machine; and changing the access value to a second value during the transfer of the data from the shared storage space to the second host machine.

33. A method comprising:

receiving a request to migrate a virtual machine from a first host machine to a second host machine;

transferring data associated with the virtual machine from the first host machine to a shared storage space in response to the request, wherein the shared storage space is separate from and shared by the first host machine and the second host machine;

preventing access to at least a portion of the data during the transfer from the first host machine to the shared storage space;

allowing access to the portion of the data in the shared storage space after the transfer; and creating a location data structure for the data on the shared storage space after the transfer, wherein the location data structure comprises a location value indicative of the data being on the shared storage space or the second host machine.

* * * * *